United States Patent

Polyak

[11] Patent Number: 5,243,867
[45] Date of Patent: Sep. 14, 1993

[54] MECHANISM FOR FEEDTHROUGH OF ROTARY MOTION TO A SEALED CHAMBER

[75] Inventor: Alexander Polyak, San Jose, Calif.
[73] Assignee: Huntington Mechanical Laboratories, Inc., Mountain View, Calif.
[21] Appl. No.: 765,990
[22] Filed: Sep. 26, 1991
[51] Int. Cl.$^5$ .................. F16J 15/50; G05G 1/00
[52] U.S. Cl. .................................. 74/18; 74/570
[58] Field of Search ............... 74/10 R, 18, 18.1, 63, 74/96, 553, 570, 571 M; 475/162

[56] References Cited

U.S. PATENT DOCUMENTS

| | | | |
|---|---|---|---|
| 2,497,867 | 2/1950 | Cymmer | 74/18 X |
| 2,561,344 | 7/1951 | Cutler et al. | 74/571 M |
| 3,082,632 | 3/1963 | Vulliez | 74/18.1 |
| 4,197,765 | 4/1980 | Shimoda | 74/553 |
| 4,646,579 | 3/1987 | Klein | 475/162 X |
| 4,683,763 | 8/1987 | Balter | 74/18.1 |
| 4,749,898 | 6/1988 | Suzuki et al. | 74/571 M X |
| 4,768,911 | 9/1988 | Balter | 414/3 |
| 4,797,053 | 1/1989 | Balter | 414/749 |
| 4,885,947 | 12/1989 | Balter et al. | 74/18.1 |
| 4,892,010 | 1/1990 | Pottier et al. | 74/18.1 X |

FOREIGN PATENT DOCUMENTS

| | | | |
|---|---|---|---|
| 1167114 | 11/1958 | France | 74/570 |
| 1573271 | 6/1990 | U.S.S.R. | 74/571 M |

Primary Examiner—Leslie A. Braun
Assistant Examiner—David W. Laub
Attorney, Agent, or Firm—David Pressman

[57] ABSTRACT

A mechanism for feedthrough of rotary motion to a sealed chamber includes a shaft (220) rotatingly supported inside a hollow housing (200). The shaft (220) comprises a front portion (222), a middle portion (224), and a rear portion (226). The front portion (222) of the shaft protrudes into a sealed external vacuum chamber (202), which is attached to the housing (200). The rear portion (226) of the shaft (220) is eccentric with respect to the rotational axis of the shaft. A cylindrical end (244) of the shaft rotatingly supports a cap (252), which is coaxial with the shaft end (244). The housing (200) and the cap (252) are sealingly and movably connected by a bellows (246). A compensator (250), eccentric with respect to the cap (252) is rotatingly mounted at the periphery of the cap (252) and is fitted into a cavity within an eccentric driver (248), the rotational axis of which is concentric with that of the shaft (220). The compensator (250) is rotatingly mounted inside a cylindrical cover (282), which is rigidly attached to the housing (200). Rotation of the driver (248) imparts planetary motion to the compensator (250), the cap (252), and the shaft end (244), which orbit the rotational axis of the shaft (220). Since the shaft end (244) is eccentric with respect to the rest of the shaft body, planetary motion of the shaft end translates into rotary motion of the shaft (220), which in turn rotates the sample inside the vacuum chamber (202).

2 Claims, 3 Drawing Sheets

MECHANISM FOR FEEDTHROUGH OF ROTARY MOTION TO A SEALED CHAMBER

BACKGROUND

1. Field of Invention

The present invention relates to a motion transmitting device, particularly to such a device which can transmit rotary motion into a sealed vacuum or pressure chamber.

2. Description of Prior Art

It is often desirable or necessary to rotate objects within a sealed chamber, which has a pressure differential with the outside. For instance, when a test specimen, such as a semiconductor wafer, is mounted on a shaft in a vacuum chamber, it is often necessary to change the position of the specimen. Rotary motion feedthrough mechanisms for this purpose are known and have been used in the past. Such mechanisms typically comprise a shaft, which extends from inside the sealed chamber to the outside via a rotary feedthrough connection, so that the shaft can be rotated from outside the chamber. The feedthrough connection is an airtight device which retains the pressure differential in the chamber. This arrangement is especially useful when it is impractical to open the chamber merely to rotate the specimen.

One of the prior art examples is shown in U.S. Pat. No. 4,683,763 to V. Balter, 1987. The apparatus includes a feedthrough shaft, which imparts rotary motion to a specimen in the vacuum chamber. The feedthrough mounting for the shaft includes a cap and a driver with a stub shaft having bearings at one end thereof. The bearings are received within a diametral groove, formed at an end face of the stub shaft. The inner periphery of the cap has a bevelled surface so that the stub shaft wobbles when the cap is rotated. When the bearings on the outer end of the stub shaft wobble, they perform orbital motion around the central axis of the feedthrough shaft. Circular movement of the bearings causes the feedthrough shaft to rotate in the same direction. This mechanism can be used, e.g., in manipulators for rotating samples within an external vacuum chamber.

Although this mechanism is simple in construction and can transmit rotary motion to a driven shaft, located within a sealed chamber, it has a number of drawbacks. The main disadvantage is that there is a point contact between the bearings and the surface of the diametral groove. When a relatively high torque is transmitted, e.g., from a stepper motor (not shown) to the feedthrough shaft, high forces are developed at the contact points. These forces cause deformation of the outer races of the bearings. Consequently, in some cases the device can transmit only 30% of the rated load capacity of the bearings. Operation of the device under increased loads causes the bearings to fail. The problem can be solved by using heavy-duty bearings of larger diameter, but this approach leads to an increase in cost, weight, and overall dimensions of the feedthrough mechanism.

It has also been proposed to solve the problem by replacing the point-contact mechanism described above by an eccentric mechanism of the type disclosed in U.S. Pat. No. 4,885,946, to V. Balter, 1989. In a feedthrough device of this patent, rotation is transmitted from an external drive element to an output shaft, sealed by a bellows, through an eccentric mechanism. This mechanism is formed by an eccentric sleeve made integrally with or welded to the driven shaft. The eccentric sleeve carries a bushing, which is supported by external bearings in the interior of a cylindrical body and by an internal bearing on the eccentric sleeve. Because of the eccentricity of the bushing with respect to the axis of rotation of the driven shaft, the bushing will orbit around the longitudinal axis of the driven shaft. Since the bushing is supported on the eccentric sleeve by bearings, its orbital movement causes the eccentric sleeve to rotate the driven shaft, which extends into the sealed chamber and which may carry a test specimen.

Although such an arrangement eliminates point contacts, the mechanism is somewhat complicated to manufacture, and is difficult to assemble and disassemble because the eccentric sleeve is either made integrally with the shaft or is permanently attached thereto, and the bellows are welded to the housings that contain the driven shaft with hermetic seams. Moreover, since the design of the apparatus prohibits placing the bushing inside the bellows, longitudinal dimensions of the device can not be reduced significantly. Furthermore, the device can not be built with increased eccentricity without enlarging its cross sectional area.

A feedthrough device, described in pending U.S. patent application Ser. No. 07/656514 (filed Feb. 19, 1991 and now abandoned), was intended to eliminate the aforementioned problems. The device is illustrated in FIG. 1, which is a longitudinal sectional view of the apparatus, and FIG. 2, which is a cross-sectional view along line 2—2 of FIG. 1. The mechanism consists of a driven shaft 122, with one end protruding into a sealed vacuum chamber 116. The middle portion of the driven shaft is rotatingly installed into a cylindrical housing 110, which is sealingly attached to vacuum chamber 116. The driven end of the shaft has two parallel flats 142 and 144 and is eccentric with respect to the rest of the shaft. An offset end 140 of the driven shaft is mounted with a precision fit into a radial slot 148 of a cylindrical insert 146, which rotatingly supports a cup-shaped cap 152. The insert has the same eccentricity with respect to the main body of the driven shaft as the offset end of the shaft. The interior of housing 110 and cap 152 form the inner sealed chamber of the feedthrough device by means of a bellows 154 that sealingly and movably attaches the cap to the housing.

Fitted onto the outer surface of the cap are two ball bearings 156 and 158, which rotatingly support a cylindrical knob 160. The latter is additionally supported by bearings 162 and 164, installed on the outer surface of housing 110. Knob 160 is coaxial with the main portion of the driven shaft and is eccentric with respect to axes of cap 152 and insert 146. Thus, rotation of the knob will cause the cap and the insert to orbit the longitudinal axis of the main portion of the driven shaft. Because the shaft is keyed to the insert through flats 142 and 144 at its driven end, orbital motions of the insert will be converted into rotation of the driven shaft around its longitudinal axis. As the shaft rotates, the end of the shaft inserted into vacuum chamber 116 imparts angular motion to the specimen inside the chamber.

The main disadvantage of this device is the need for intricate machining of its mating parts, i.e., for a precision fit between the offset end of the driven shaft and the radial slot of the cylindrical insert. The lack of a perfect match between the end of the shaft and the slot may result in either difficulties during assembly of the apparatus or noticeable play in the mechanism, creating localized stresses which may cause the device to fail. The machining required to obtain the needed precision fit contributes to a significant increase in the manufacturing cost of the device.

OBJECTS AND ADVANTAGES

It is an object of the invention to provide a rotary-motion feedthrough device which overcomes the foregoing disadvantages, is capable of transmitting heavy loads, and is inexpensive to manufacture. Another object is to provide a device which has a self-aligning play compensation drive mechanism with surface contacts that prevent stress-induced failure. Further objects and advantages will become apparent after consideration of the ensuing description and the accompanying drawings.

DRAWING FIGURES

REFERENCE NUMERALS USED IN THE DRAWINGS AND DESCRIPTION

Figure 1:
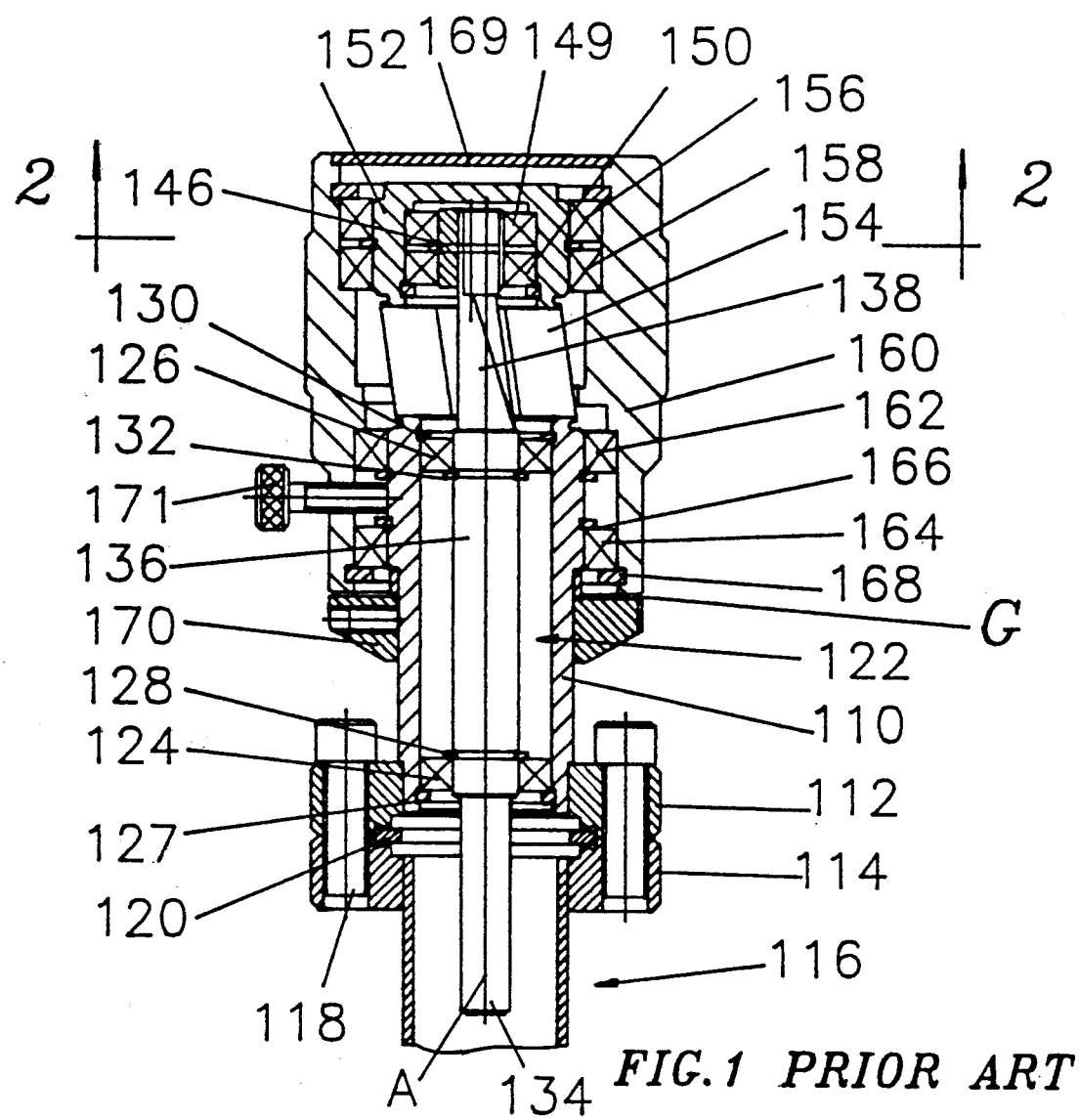
FIG. 1 is a longitudinal sectional view of a prior-art rotary motion feedthrough device.
Figure 2:
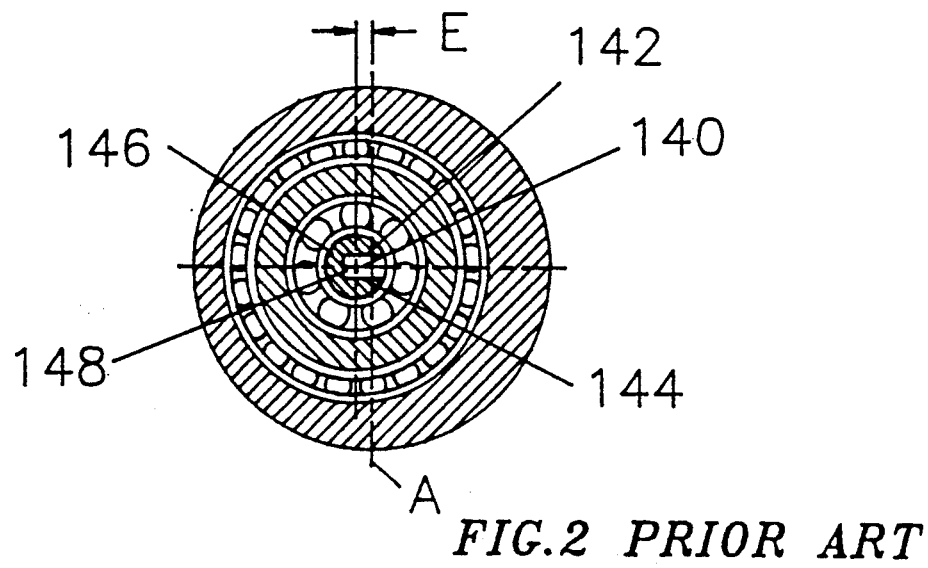
FIG. 2 is a cross-sectional view along lines 2—2 of FIG. 1.

200—housing
202—sealed external vacuum chamber
204, 206—flanges
208, 210, 212, 214, 216, 218—bolts
220—shaft
222—front portion of shaft
224—middle portion of shaft
226—rear portion of shaft
228, 230, 232, 234, 236, 238, 240, 242—bearings
244—shaft end
246—bellows
248—eccentric driver
250—eccentric compensator
252—cap
254, 256—spacers
258—spring
260, 262, 264, 266—snap rings
268—retainer
270—knife-edge type seal
272—flange
274, 276—hermetic weld seams
278—opening
280—keyway
282—cover

DESCRIPTION—FIGS. 3 AND 4

Figure 3:
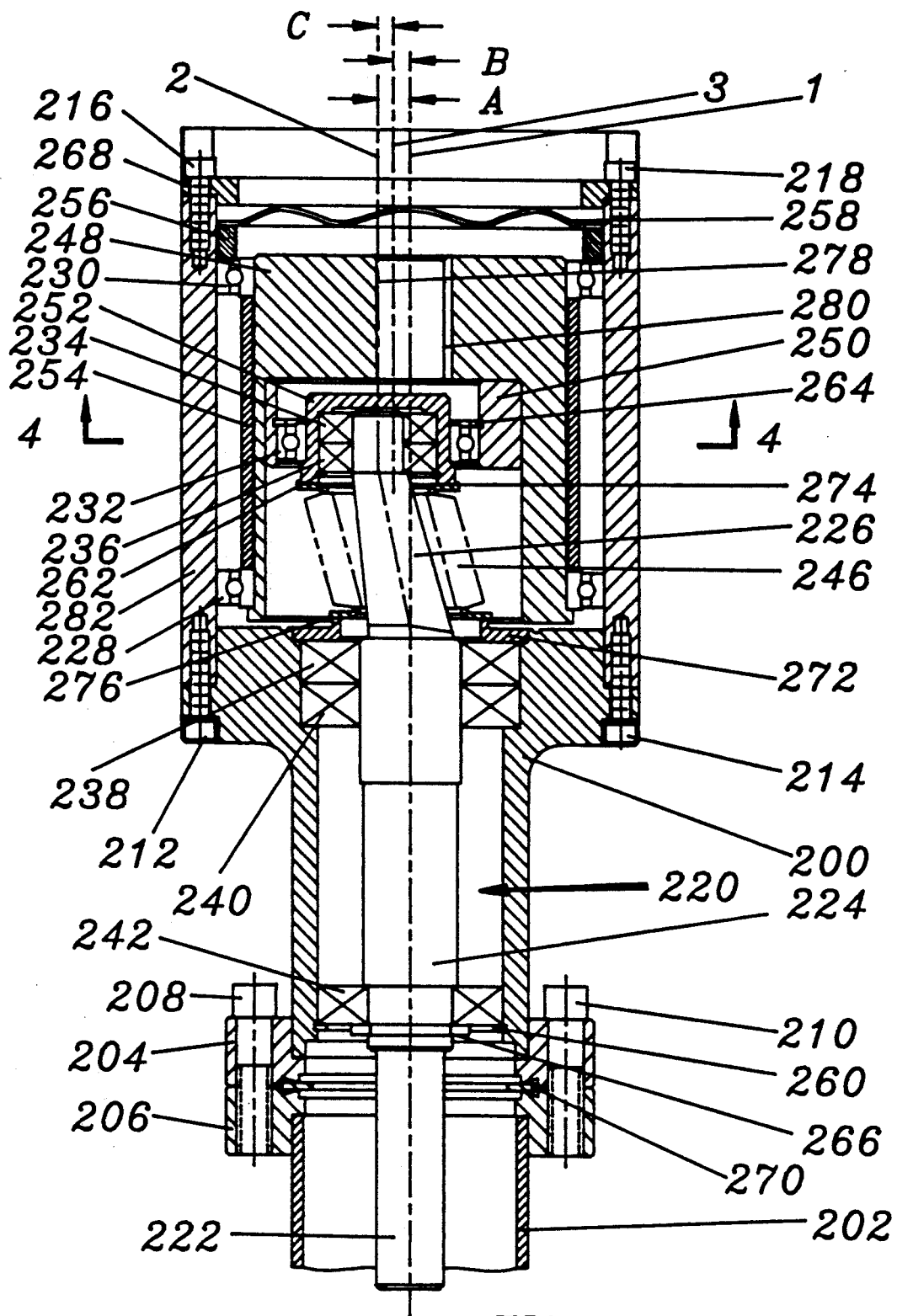
FIG. 3 is a longitudinal sectional view of a rotary motion feedthrough device of the invention.
Figure 4:
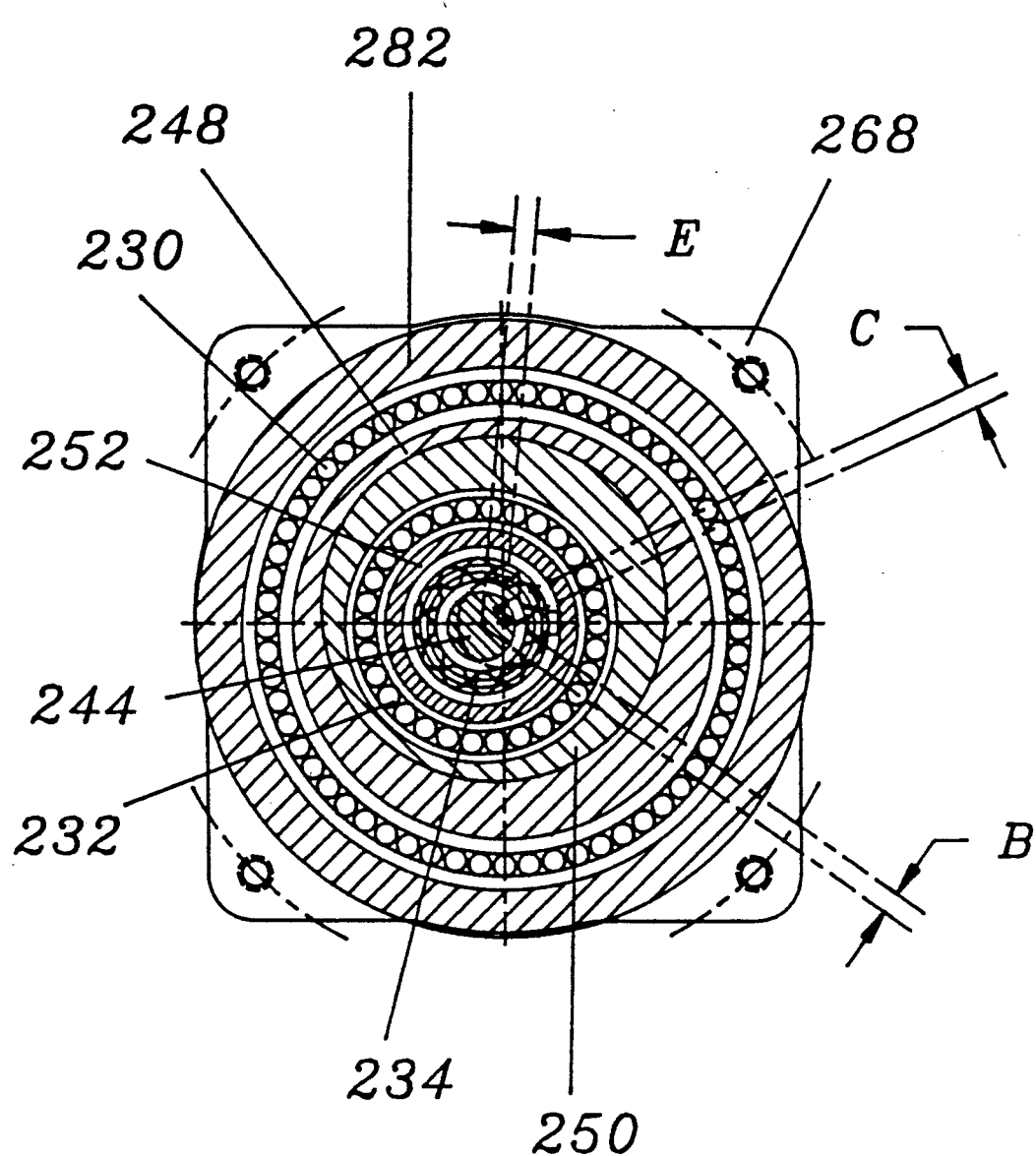
FIG. 4 is a cross-sectional view along lines 4—4 of FIG. 3.

A longitudinal cross-sectional view of a feedthrough mechanism of the present invention is shown in FIG. 3.

The device includes a shaft 220, which is rotatingly supported inside a hollow housing 200 by bearings 238, 240, and 242, with snap ring 266 anchoring the shaft inside the housing. Bearing 242 is retained within housing 200 by means of a snap ring 260. Bearings 238 and 240 are located in a recess formed between housing 200 and a flange 272, rigidly attached thereto.

Shaft 220 comprises a front portion 222, a middle portion 224, and a rear portion 226. Front portion 222 protrudes into a sealed external vacuum chamber 202, which is attached to housing 200 by means of flanges 204 and 206 and bolts 208 and 210. A knife-edge type seal 270 isolates chamber 202 from the atmosphere. Front portion 222 and middle portion 224 of shaft 220 are coaxial.

Rear portion 226 is eccentric with respect to the rotational axis of shaft 220. A cylindrical shaft end 244 rotatingly supports a cup-shaped cap 252 on bearings 234 and 236, which are secured inside the cap with a snap ring 262. Cap 252 is coaxial with shaft end 244. Housing 200 and cap 252 are sealingly and movably connected by a bellows 246, which is attached to the housing and the cap with hermetic weld seams 274 and 276. Thus, the volume formed by housing 200, cap 252, and bellows 246 is the inner sealed chamber of the feedthrough device, which is connected to sealed vacuum chamber 202.

A bearing 232 rotatingly supports an eccentric compensator 250 at the periphery of cap 252. A snap ring 164 prevents eccentric compensator 250 from slipping over bearing 232. The central axis of the periphery of compensator 250 is offset a distance C with respect to the central axis of rear portion 226 of shaft 220. Eccentric compensator 250 is fitted into a cavity of an eccentric driver 248. The central axis of the aforementioned cavity has an eccentricity B with respect to the rotational axis of shaft 220. Morever, shaft end 244 has eccentricity A with respect to the rotational axis of shaft 220, such that $B+C \geq A \geq B-C$. The eccentric drive of the mechanism is not sensitive to fluctuations in production tolerances of the eccentricities of its components. The design of the apparatus provides for inherent self alignment and play compensation between its mating parts.

Driver 248 is rotatingly mounted inside a hollow cylindrical cover 282 on bearings 228 and 230, which are separated by a spacer 254. A spacer 256 and a spring 258 are positioned between bearing 230 and a retainer 268, which is connected to cover 244 by bolts 216 and 218. Cover 282 is rigidly attached to housing 200 by means of bolts 212 and 214.

A cylindrical opening 278 is centrally located within driver 248. A keyway 280 is longitudinally machined at the periphery of opening 278 for mounting an external drive mechanism, such as a manual feedthrough mechanism (not shown).

All parts of the device, i.e., housing 200, cap 252, shaft 220, and other parts operating in deep vacuum, are made of stainless steel.

In one specific embodiment of the invention, the rotary motion transmitting device had an overall length of about 17 cm. The outer diameter of cover 282 was approximately 10 cm.

OPERATION—FIGS. 3 AND 4

The rotary motion transmitting device shown in FIG. 3 is able to control angular position of a sample holder (not shown) inside vacuum chamber 202. It is, however, understood that this device is given only as an example and that the invention is not limited to a system of this particular construction. The device of this embodiment of the invention operates as follows:

Prior to operation, a sample (not shown) is placed onto the sample holder (not shown) inside vacuum chamber 202. A vacuum is then created in the vacuum chamber by its usual vacuum pump (not shown). Rotation of the external feedthrough mechanism (not shown), coupled to eccentric driver 248 through keyway 280 and a key (not shown), causes eccentric driver 248 to rotate inside cover 282 on bearings 228 and 230. As previously mentioned, driver 248 is eccentric with respect to compensator 250 and shaft end 244. Rotation of driver 248 imparts planetary motion to compensator 250, cap 252, and shaft end 244, which orbit the rotational axis of shaft 220. Bellows 246 provide a flexible hermetic seal, isolating rear portion 226 of the shaft and hence the inner sealed chamber of the feedthrough device from the atmosphere while shaft end 244 is in motion. Because of the eccentricity of shaft end 244 with respect to middle portion 224 and front portion 222 of the shaft, planetary motion of the shaft end is translated into angular motion of shaft 220, which in turn rotates the sample inside vacuum chamber 202.

SUMMARY, RAMIFICATIONS, AND SCOPE

Thus, it has been shown that the invention provides a rotary motion feedthrough device which has a self-aligning play compensation drive mechanism with surface contacts that prevent stress-induced failure, is capable of transmitting heavy loads, does not require intricately machined parts, and is inexpensive to manufacture.

Although the rotary motion feedthrough device has been shown and described in the form of a specific embodiment, its parts, materials, and configurations are given only as examples, and many other modifications of the rotary motion feedthrough mechanism are possible. For example, rotation of the shaft and hence of the specimen can be controlled by a programmed device. The eccentric driver and the eccentric compensator can be manufactured as a unit. The vacuum chamber may be replaced by a pressure chamber or a sealed chamber containing a hazardous substance. Materials other than stainless steel can be used for the manufacture of the parts. Therefore, the scope of the invention should be determined not by the example given, but by the appended claims and their legal equivalents.

What I claim is:

1. A mechanism for feedthrough of rotary motion to a sealed vacuum chamber located outside said mechanism, said mechanism having a cylindrical housing sealingly connected to said sealed vacuum chamber, said cylindrical housing having a first central axis, said mechanism comprising:

a driven shaft having a first axis of rotation coinciding with said first central axis, a first end portion protruding into said sealed vacuum chamber, an intermediate portion rotatingly supported in said cylindrical housing, and a second end portion having a second central axis possessing eccentricity A with respect to said first axis of rotation, said first end portion and said intermediate portion both having said first axis of rotation;

a cup-shaped body having a concave interior portion and said second central axis, said cup-shaped body being rotatingly and removably mounted on said second end portion, said concave interior portion facing said cylindrical housing;

a flexible bellows sealingly connecting said cylindrical housing to said concave interior portion of said cup-shaped body;

a retaining housing having said first central axis, said retaining housing being rigidly attached to said cylindrical housing; and a hollow collar having a first peripheral cylindrical surface with a third central axis possessing an eccentricity B with respect to said first axis of rotation, a cylindrical body rotatingly installed inside said retaining housing, said cylindrical body having a cylindrical opening with said third central axis possessing eccentricity C with respect to said second central axis, such that $B+C \geq A \geq B-C$, and a second peripheral cylindrical surface having said first axis of rotation, said hollow collar being rotatingly supported by said cup-shaped body, said cylindrical housing providing automatic alignment of said hollow collar into said eccentric cylindrical opening during the assembly of said mechanism for feedthrough of rotary motion, whereby said hollow collar and said cylindrical body move as a single unit during the rotation of said driven shaft.

2. The mechanism of claim 1 wherein said flexible bellows are connected to said cup-shaped body and to said retaining housing by hermetic welds.

* * * * *